C. E. W. DOW.
AIR TREATING MACHINE.
APPLICATION FILED APR. 9, 1910.
968,332.
Patented Aug. 23, 1910.
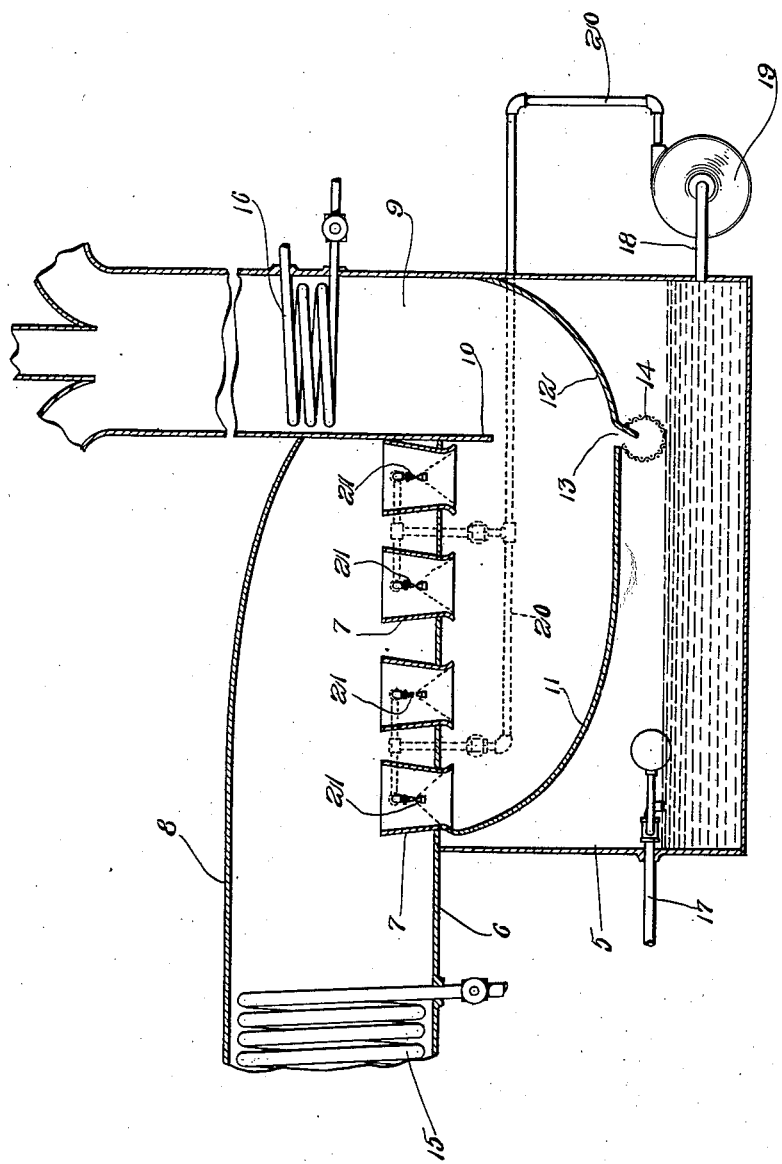
Witnesses:
L. P. Weymouth
J. E. Fitzgerald
Inventor:
Charles E. W. Dow
By Henry J. Miller
Atty.

UNITED STATES PATENT OFFICE.

CHARLES E. W. DOW, OF BOSTON, MASSACHUSETTS, ASSIGNOR TO AMERICAN MOISTENING COMPANY, A CORPORATION OF MAINE.

AIR-TREATING MACHINE.

968,332. Specification of Letters Patent. Patented Aug. 23, 1910.

Application filed April 9, 1910. Serial No. 554,403.

*To all whom it may concern:*

Be it known that I, CHARLES E. W. DOW, of Boston, in the county of Suffolk and State of Massachusetts, have invented certain new and useful Improvements in Air-Treating Machines, of which the following is a specification, reference being had to the accompanying drawings, forming part thereof.

This invention has reference to improvements in machines through which air may be passed, and moistened during its passage, or in which the air, passing therethrough, may be washed and warmed.

One object of the invention is to improve the construction of machines of this general character.

This invention consists in the peculiar features of construction and combination of parts to be hereinafter more fully described and pointed out in the claims.

The drawing represents a vertical sectional view of the improved air treating machine, the pump casing and the piping system being shown in elevation.

As shown in the drawing, in its preferred form, 5 indicates a chamber the lower part of which is adapted to contain water and the upper part of which has the wall 6 extending at one end beyond the chamber 5 and furnished, above said chamber, with one or more openings in which are seated flues 7, 7 preferably slightly conical in shape. The wall 6 forms the bottom of an air inlet of which the wall 8 is the top so that air entering through said inlet must pass through the flues 7, 7 before reaching the chamber 5. At the inner end of said air inlet is located the air outlet 9, the wall 10 of which extends downward below the wall 6 to form a baffle. Curving downward from opposite ends of the chamber 5 are drip receiving plates 11 and 12 the adjacent ends of which are separated by the opening 13 beneath which is located the screen or strainer 14 adapted to receive water passing through said opening 13.

The air inlets and outlets are furnished respectively with the heating coils 15 and 16, to which steam can be supplied. Water is supplied to the chamber 5 through the pipe 17 controlled by its ordinary float valve and water is taken from said chamber 5 through pipe 18 to the pump 19 from whence it is supplied under suitable pressure through pipe 20 to the atomizers or sprayer devices 21, 21 located in the flues 7, 7.

In operation, water is supplied under pressure to the atomizers 21, 21 and issues therefrom as cones of spray which induce the flowage of air through the funnels 7, 7 and at the same time moisten said air and wash the impurities therefrom, the surplus moisture falls on to the plate 11 and passes through the opening 13 into the screen 14 which retains the foreign matter washed from the air; as the air passes downward through the flues 7, 7 it flows over the plates 11 and 12, beneath the edge of the baffle 10 and passes out in its moistened and purified condition through the outlet 9, while the moisture which accumulates on the baffle 10 drips on to the plate 12 and runs through the opening 13.

When it is desired to wash and purify the air passing through the machine, without increasing the humidity of said air when delivered from the machine, steam is supplied to the coils 16 and the heat radiated from said pipes tends to dry the moisture in said air. When, however, it is desired to supply air passing through the machine with considerable moisture, steam is supplied to the pipe coils 15 and the temperature of the air is raised prior to its passage through the moistening heads formed by the flues 7, 7 and their atomizers 21, 21 whereby the heated air in passing through the water sprays of said funnels tends to attract and take up considerable proportions of the moisture. In this latter case steam would not, ordinarily, be supplied to the coils 16.

While I have herein specifically shown and described my invention in its preferred form I do not desire to thereby limit my invention in any way.

Having thus described my invention I claim as new and desire to secure by Letters Patent.

1. A machine for treating air comprising an air inlet, an air outlet separated from said inlet by a partition, a moistening head with which said inlet communicates, a compartment having communication with said moistening head and with said outlet, and a water receptacle below said compartment.

2. A machine for treating air comprising an air inlet, an air outlet separated from said inlet, a moistening head with which said inlet communicates, a compartment below said moistening head and communicating therewith and with said outlet, said compartment having a curved bottom furnished with an opening, a water receptacle below said compartment, a pump and pipes connecting said pump with said water receptacle and with said moistening head.

3. A machine for treating air comprising a chamber divided by curved plates into an upper compartment and a lower water receptacle and having a top furnished with one or more moistening devices communicating with said compartment, an air inlet chamber inclosing the upper parts of said moistening device or devices, air heating means in said inlet chamber, an air outlet communicating with said compartment, and air heating means located in said outlet, substantially as described.

CHARLES E. W. DOW.

Witnesses:
H. J. MILLER,
F. E. FITZGERALD.